(12) United States Patent
Zhu et al.

(10) Patent No.: US 10,661,194 B2
(45) Date of Patent: May 26, 2020

(54) VACUUM DISTILLATION AND DESALINATION

(71) Applicant: New Jersey Institute of Technology, Newark, NJ (US)

(72) Inventors: Chao Zhu, Edison, NJ (US); Zhiming Ji, Whippany, NJ (US); Mengchu Zhou, Basking Ridge, NJ (US); Guangyu Guo, Kearny, NJ (US); Bo Zhang, Kearny, NJ (US)

(73) Assignee: New Jersey Institute of Technology, Newark, NJ (US)

( * ) Notice: Subject to any disclaimer, the term of this patent is extended or adjusted under 35 U.S.C. 154(b) by 13 days.

(21) Appl. No.: 15/993,093

(22) Filed: May 30, 2018

(65) Prior Publication Data

US 2018/0345167 A1  Dec. 6, 2018

Related U.S. Application Data

(60) Provisional application No. 62/512,780, filed on May 31, 2017.

(51) Int. Cl.
*B01D 1/26* (2006.01)
*B01D 3/10* (2006.01)
(Continued)

(52) U.S. Cl.
CPC .............. *B01D 3/10* (2013.01); *B01D 1/0082* (2013.01); *B01D 1/16* (2013.01); *B01D 1/26* (2013.01);
(Continued)

(58) Field of Classification Search
CPC .......... B01D 1/0082; B01D 1/16; B01D 1/26; B01D 3/10; B01D 3/146; B01D 5/0003;
(Continued)

(56) References Cited

U.S. PATENT DOCUMENTS

| | | |
|---|---|---|
| 4,319,964 A | 3/1982 | Katz et al. |
| 4,536,257 A | 8/1985 | Atwell |

(Continued)

OTHER PUBLICATIONS

Zhu et al., U.S. Appl. No. 62/347,670, filed Jun. 9, 2016, titled "System and Method for Vacuum Generation".

(Continued)

*Primary Examiner* — Renee Robinson
(74) *Attorney, Agent, or Firm* — Lerner, David, Littenberg, Krumholz & Mentlik, LLP

(57) ABSTRACT

A system and method for vacuum distillation and desalination contains integrated vacuum generation. Latent heat and a vacuum produced with steam condensation are used for distillation and desalination of liquid. The distillation and desalination system could comprise a spray evaporator and a condenser for receiving a feed stream for distillation or desalination. Produced are water flow condensate and concentrated liquid flow. A vacuum pump is actuated with condensation-induced dual-action piston-cylinder vacuum generation technology. The vacuum generator is configured to transfer latent heat from condensing steam vapor in its cylinder to the feed stream. Steam is also configured to transfer latent heat directly to the feed stream circulated through evaporators and condensers. A distillation and desalination method with active vacuuming and self-distillation in staggered multi-stage arrangement provides for efficient energy recovery. Use of multi-stage arrangement maximizes thermal energy usage for increased distillation capacity and applicability.

15 Claims, 3 Drawing Sheets

(51) Int. Cl.
*C02F 1/12* (2006.01)
*B01D 3/14* (2006.01)
*B01D 5/00* (2006.01)
*C02F 1/06* (2006.01)
*B01D 3/00* (2006.01)
*B01D 1/00* (2006.01)
*B01D 1/16* (2006.01)
*C02F 103/08* (2006.01)

(52) U.S. Cl.
CPC ............ *B01D 3/007* (2013.01); *B01D 3/146* (2013.01); *B01D 3/148* (2013.01); *B01D 5/0003* (2013.01); *B01D 5/006* (2013.01); *C02F 1/06* (2013.01); *C02F 1/12* (2013.01); *C02F 2103/08* (2013.01); *C02F 2301/08* (2013.01); *C02F 2303/10* (2013.01)

(58) Field of Classification Search
CPC ... B01D 5/006; C02F 1/04; C02F 1/12; C02F 1/16
See application file for complete search history.

(56) References Cited

U.S. PATENT DOCUMENTS

| | | | |
|---|---|---|---|
| 4,770,748 A | 9/1988 | Cellini et al. | |
| 5,441,606 A | 8/1995 | Schlesinger et al. | |
| 5,534,118 A | 7/1996 | McCutchen | |
| 5,552,022 A | 9/1996 | Wilson | |
| 5,968,312 A * | 10/1999 | Sephton | B01D 1/065 159/18 |
| 6,833,056 B1 | 12/2004 | Kamiya et al. | |
| 9,309,129 B1 * | 4/2016 | Zeitoun | C02F 1/04 |
| 2008/0083605 A1 * | 4/2008 | Holtzapple | C02F 1/041 203/11 |
| 2016/0288012 A1 * | 10/2016 | Zeitoun | B01D 1/26 |
| 2017/0356431 A1 | 12/2017 | Zhu et al. | |

OTHER PUBLICATIONS

Zhu et al., U.S. Appl. No. 62/393,142, filed Sep. 12, 2016, titled "System and Method for Vacuum Generation".

* cited by examiner

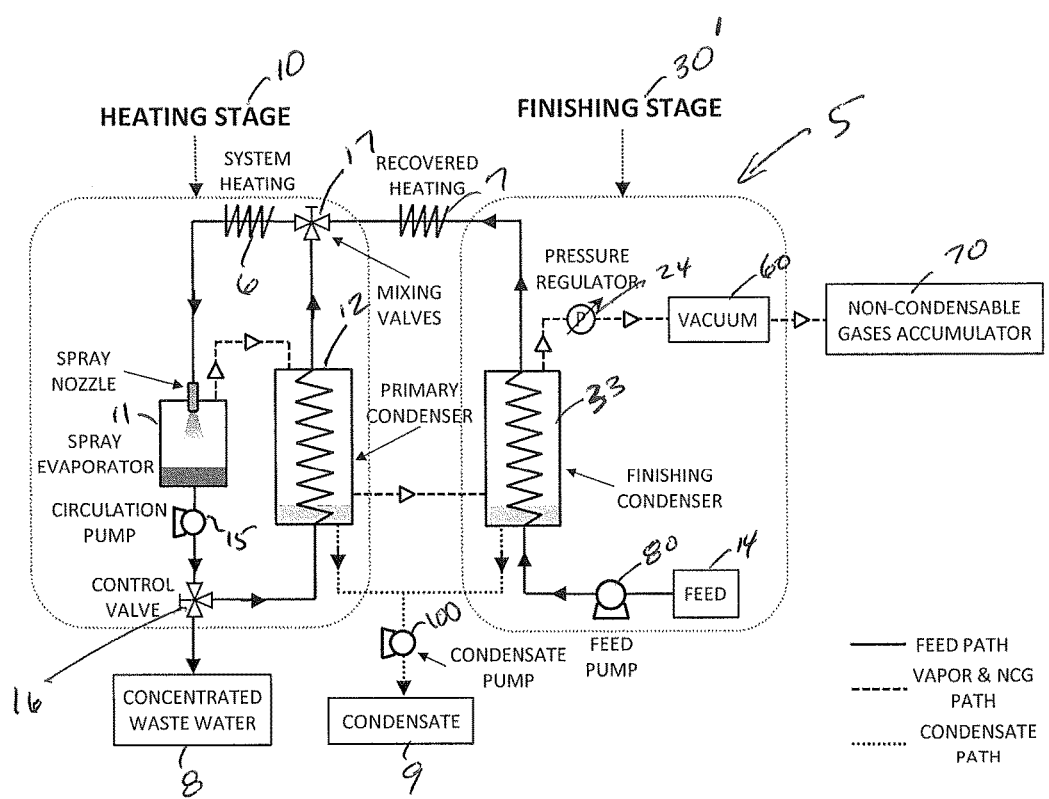
Figure 5. Schematic diagram of an exemplary vacuum vaporization distillation unit without any inter-stage module

VACUUM DISTILLATION AND DESALINATION

CROSS-REFERENCE TO RELATED APPLICATIONS

The present application claims the benefit of the filing date of U.S. Provisional Patent Application No. 62/512,780 filed on May 31, 2017, the disclosure of which is hereby incorporated herein by reference.

TECHNICAL FIELD

The present disclosure relates generally to distillation and desalination systems and methods thereof. More particularly, the present disclosure relates to a vacuum thermal distillation system for liquid solutions containing an evaporative solvent and a non-evaporative solvent, solute or salt, such as salt found in sea water desalination, oil in oil-contaminated water, as well as solutes found for waste water treatment, and integrated with condensation-induced vacuum generation and heat transfer to a distillation unit or with a commercial vacuum pump.

BACKGROUND

Both economic growth and population growth have driven the ever-increasing demand for energy and water. Water scarcity already affects every continent. Almost one-fifth of the world's population lives in areas of physical scarcity and an increasing number of regions are chronically short of water. A substantial amount of fresh water is wasted, polluted, and unsustainably managed. Less than one percent of water on the earth's surface is suitable as an eligible water source for direct consumption in domestic or industrial applications. More energy-intensive water is currently being used to compensate for the decline in water availability. Purification and desalination of wastewater, seawater, or brackish water become an important, but expensive, solution for water supply issues. While distillations to potable water are needed for human survival, there are also huge demands for other distillation applications, such as irrigation in agriculture or planation and water-assisted industrial processes, which may tolerate less purification requirements including allowance with condensable vapors other than water vapor.

Distillation involves the production of evaporative/condensable solvents from non-evaporative solvents and/or solutes, such as fresh water from waste water or saline water. Distillation is one of the earliest forms of water treatment. There are two basic methods: thermal distillation and membrane separation. Thermal distillation uses heat to boil to-be-treated water into vapor, leaving the non-evaporative solvents or solutes behind, that is collected and condensed back into water by cooling it down. Some derivatives of the methods include vacuum distillation processes used in refineries. The process involves vaporous extraction of water. Vapor compression distillation (VCD) is a thermal desalination process, such as MSF (multi-stage flash) and MED (multiple effect distillation), which has in the past provided the majority of potable water in regions where excess heat from power plants is used to heat and desalinate seawater. These are efficient and viable solutions when there is waste heat or sufficient electricity available.

In membrane separation, seawater is forced through a semipermeable membrane that separates salt from water. The most common type of membrane separation is reverse osmosis. Membrane distillation (MD) uses hydrophobic membranes and differences in vapor pressure for separation and distillation. The vapor pressure difference across a membrane can be generated by pressurization (such as in reverse osmosis distillation), heating (such as in thermal membrane distillation), or vacuuming, or their combination. Common configurations of membrane distillation are direct contact MD, air gap MD, and vacuum MD. Vapor compressor has been used in some MD processes to increase the difference in vapor pressure in membrane distillation. Vacuum has also been applied in other MD processes to maintain the pressure in the permeate side of the membrane at less than the saturation pressure of the vapor to be separated from the hot feed solution.

Vacuum membrane distillation (VMD) uses vacuum to achieve higher partial pressure gradients, and hence higher permeate flux. The use of vapor compressor or the conventional vacuum pump contributes to the overall energy consumption of these MD processes. The use of hydrophobic membranes in MD and VMD distillation processes incurs operational cost due to the need for cleaning and replacement of membranes, in addition to the other limitations in applications such as hydrophobicity requirement between solutions and membrane and operation limits in temperature and pressure of membrane materials.

Multi-stage flash distillation (MSF) can be either a once-through (no brine recirculation) or brine recirculation flow system. Successive evaporation of brine water into flash steam is coupled with condensation inside the stages, such that the evaporation latent heat is recovered by preheating feed seawater. During the process, the feed flows through cooling tubes inside the condensation chambers of stages to receive the latent heat of the vapor to produce condensate and vacuum. The direction of the flow is from the last stage to the first stage and the temperature of the feed is increased by each stage. After exiting the first stage, the temperature of the feed is further increased by a heater. The heated feed is then flows through the evaporation chambers of stages, from the first to the last. The vacuum formed in the condensation chamber of the stage reduces the pressure inside the evaporation chamber below the vapor pressure of the liquid, inducing the liquid inside the chamber to evaporate at a rate self-sustained with the condensation later in the condensation chamber. An orifice is placed on the flow path of the feed between two neighboring stages for reducing the pressure of the flow. Demisters are placed between the evaporation and condensation chambers to remove the entrained brine droplets from the vapor. This is essential to prevent increase in the salinity of product water or scale formation on the outer surface of the condenser tubes.

Seawater has many different gases dissolved in it, especially nitrogen, oxygen, carbon dioxide and argon. They do not react chemically and are not easily condensed by cooling. They are referred to as non-condensable gases (NCG). The presence of non-condensable gases may also be caused by the leakage of ambient air into the process operating under vacuum. The presence of non-condensable gases is a serious problem in seawater distillation. Extensive pretreatment, which includes de-aeration, antifoam, and anti-scalent additions, is often applied to the feed stream, in addition to the removal of suspended solids.

Thus there still remains a need in the art for a system and method to avoid the above issues. In addition, there remains a need for a distillation and desalination system that prevents the accumulation of non-condensable gases and avoids surface scaling or fouling associated with current systems, as well as improves efficiency of thermal energy utilization.

SUMMARY

The current system and method overcomes drawbacks of previous attempts and current systems and also adds several other benefits not found in current systems. Indeed, the system and method for distillation and desalination of the current invention provides many benefits. The vacuum vaporization distillation process disclosed herein is a thermal distillation where a vacuum is used to reduce the temperature needed for water to vaporize, without the use of membranes. By integrating a novel condensation-induced vacuum generation technology with a vacuum vaporization distillation process, both the quietly produced vacuum and the latent heat of condensation during vacuum generation produces a more energy efficient thermal distillation system. The disclosed system not only is structurally simple and scalable but also requires no expensive replacement parts such as membranes and pre-filters required in other systems like Membrane Distillation (MD) and Reverse Osmosis (RO) systems. In addition, the present invention may use only low-temperature energy resources for low pressure steam generation. Thus the system is cost efficient in both facility and operation.

Furthermore, the disclosed vacuum vaporization distillation and desalination system and method are also a thermal distillation process. In one embodiment, the process employs interconnected paths for active vapor extraction in each and every stage by a vacuum system. This active vacuum operation prevents the accumulation of non-condensable gases in each stage by removing the unwanted non-condensable gases through the vapor paths. The disclosed process also uses atomized spray under a depressurized environment to vaporize liquid in space without surface contact. This avoids the surface scaling or fouling problem. With active vapor extraction, the locally superheated atomized droplets are the heat source for the latent heat of vaporization, instead of exchangers or heaters, and residue droplets from the spray release latent heat and cool down during vaporization. The active vapor extraction also promotes a non-thermal-equilibrium vaporization process during which the vapor generated and residue droplets eventually possess different averaged temperatures. The temperature difference between the vapor generated and residue droplets is larger than the temperature difference produced in a thermal-equilibrium vaporization process, which makes the self-condensation (i.e., vapor condensed by cooling from residue droplets), an extra-distillation, that is feasible within the same vaporization process.

In addition, the disclosed system and method for distillation employs a vacuum source for active vapor extraction during the distillation process. For example, while commercial vacuum pumps may serve as the source of vacuum, a system and method for multi-level vacuum generation and storage has an integrated system to take full advantage of ability to operate with low-quality energy source for quietly generating a vacuum. The heat produced during vacuum generation for distillation as well as the benefit of scalability is also an advantage. The condensation-induced vacuum technology disclosed therein operates with steam generated from a steam boiler or waste steam from other applications. Since the steam for generating the vacuum with this technology only needs to be saturated at a slightly-above atmospheric pressure, solar or wind generated power or heat from other green energy and waste heat resources could be used for producing the steam.

The latent heat of the source steam is recovered through coolant used in the vacuum generation. This latent heat is the heating source in the disclosed distillation system. Furthermore, the disclosed system requires no expensive replacement parts (i.e., such as membranes and pre-filters required in MD and RO systems). In addition, the disclosed system has the benefit of using only low-temperature energy resources for low-pressure steam generation as well as having a high operation tolerance to the variety of distillation solutions (e.g., alkaline or acidic fluids) or even slurries with fine solids. Accordingly, the system is cost efficient in both facility and operation, with a wide applicability.

A vacuum vaporization distillation system 1 could comprise one heating stage 10, one or multiple inter-stages 20 or without any, one finishing stage 30, a condensation-induced vacuum generator 40, and actuator in fluidic communication with the vacuum vaporization distillation stages, and various heat exchangers, flow-control pressure and level transmitters, valves and pumps are provided in accordance with one embodiment.

The heating stage 10 comprises a heating element or a heat exchanger both reference 6, a spray evaporator 11, and a primary condenser 12 (also known as a self-distillation condenser). The heating stage 10 could be configured to receive an input feed (such as, but not limited to, waste water or sea water) for distillation, pressurize and heat the feed to the state of a compressed liquid, spray the feed into its spray evaporator. The heating element or the heat exchanger 6 could be configured as reference numeral 7 to share the same steam generated from a steam boiler 50 or waste steam used by the condensation-induced vacuum technology. The spray droplets could partially vaporize in a lower pressure environment produced by the vacuum source 40 or 60 and produce an output flow of vapor and the remaining droplets settled to form colder and more concentrated liquid 8. To ensure and maximize the non-thermal-equilibrium in spray vaporization, there should be no pre-vaporization before or during the spray formation. The primary condenser 12 with still lower pressure could receive from the spray evaporator 11 the vapor into its chamber and also receive the colder liquid formed by the remaining droplets into its cooling pipe as coolant for an immediate condensation of the same vapor just extracted into the primary condenser 12. Such an embodiment of condensation arrangement is referred to as self-distillation. The condensation-heated liquid is circulated back again as the feed to the evaporator of the heating stage. Whenever the concentration of the liquid reaches a desired level, a control valve would direct the liquid to exit the circulation. A mixing valve, a check valve for example, would allow fresh feed to be added into the re-circulated feed to compensate for any loss of liquid due to the removal of concentrated liquid and water vaporization from the evaporator. The lower pressure in the primary condenser could be maintained by the vacuum source through a secondary condenser in the immediately following stage. Any remaining vapor and accumulated non-condensable gases in the primary condenser chamber would also flow into and be condensed further by the secondary condenser in the immediately following stage.

System 2 illustrates an inter-stage 20 that could comprise a spray evaporator 21, a primary condenser 22, and a secondary condenser 23. The spray evaporator 21 and the primary condenser 22 would work together in a manner similar to the pair in the heating stage 10 and perform self-distillation, but the colder liquid would be recirculated in a different way. After passing through the cooling pipe in the primary condenser 22, the liquid from residue droplets would continue through the cooling pipe of the secondary condenser 23 for condensing the vapor from the primary condenser 22 of the immediately preceding stage while being heated-up from condensation heat absorption, and then be circulated back again as the feed to the spray evaporator of the same stage. A mixing valve 17, a check valve for example, would allow fresh feed to be added into the re-circulated feed to compensate for any loss due to the removal of concentrated liquid and water vaporization from the evaporator. The secondary condenser 23 could be configured to receive any remaining vapor and accumulated non-condensable gases from the primary condenser chamber in the immediately preceding stage. Hence the secondary condenser is for the second condensation of vapor from the immediately preceding stage, not functioned as a second condenser to the vapor generated from the current stage. The lower pressure in the secondary condenser 23 would be maintained by the vacuum source through a pressure regulator 24. In the same manner, the lower pressure in the primary condenser could be maintained by the vacuum source through a secondary condenser 23 in the immediately following stage. Any remaining vapor and accumulated non-condensable gases in the primary condenser chamber would flow into and be condensed further by the secondary condenser 23 in the immediately following stage. Any remaining vapor and accumulated non-condensable gases in the secondary condenser would flow through the pressure regulator and be processed further by a condenser in the finishing stage 30.

The finishing stage 30 is the final step in the distillation system for the vapor condensation and heat recovery. It comprises a finishing condenser (primary) 31 and a secondary condenser 32. The secondary condenser would be configured to receive any remaining vapor and accumulated non-condensable gases from the primary condenser chamber in the immediately preceding stage. The finishing condenser would be configured to receive any remaining vapor and accumulated non-condensable gases from the secondary condensers of all the preceding stages. Both condensers would be configured to receive the source feed through a feed pump into their cooling pipes as coolant. The source feed would receive some heat from any remaining vapor and accumulated non-condensable gases flowing through the two condensers and condense some or all the remaining vapor. The same feed would then be supplied to all the preceding stages through the mixing valves (check valves for example) as the original circulating liquid as well as the replacement for the water condensate 9 removed from the all the primary and secondary condensers and the concentrated liquid removed from all the spray evaporators. After leaving the condensers in the finishing stage and before becoming the circulating feed to each previous stage, the source feed would be configured to receive recovered heat produced by the vacuum generation unit for heat recovery. The NCG and any residue of condensable vapors after the finishing stage will be extracted into the vacuum system for further process or disposal.

A staggered multiple-stage distillation system is provided in accordance with another embodiment. In addition to the heating stage and the finishing stage, the distillation system could include, for example, inter-stages 0 to N, where N is an integer. The number N can be any number greater than or equal to zero. The number N may be chosen based on, for example, but without limitation, a flow rate control, a processing capacity, an inter-stage cost, a temperature range, and an energy use.

The vacuum vaporization distillation system would contain a circulation and pressurization pump for each spray evaporator for recirculating the feed and for atomizing spray as well as for removing brine or waste liquid when it reaches certain concentration. The heating stage would contain a heating element or a heat exchanger for heating the input feed to a temperature such that the feed reaches the state of a compressed liquid for its pressure. Each secondary condenser would be equipped with a pressure regulator on its connection pipe to vacuum source through the finishing condenser. Each condenser would be equipped with a pump 100 for removing water condensate 9. A switch or transmitter would be employed for monitoring the liquid level inside each evaporator. This switch or transmitter would be used to control the operation of the associated circulation pump and its use would be essential before the circulation of the liquid flow reaches its steady operation state.

Another switch or transmitter would be employed for monitoring the liquid concentration in each evaporator. This switch or transmitter would be used to control the removal of concentrated liquid from the circulation. The vacuum generation unit would maintain the low pressure in all the evaporators and condensers and extract accumulated non-condensable gases through the vapor paths. The heating stage and each of the inter-stages would receive and process their own feed in its spray evaporator, feed its own processed vapor and accumulated non-condensable gases in its primary condenser to the secondary condenser in the immediately following stage, and pass its own remaining vapor and accumulated non-condensable gases to its secondary condenser and then to the finishing condenser in the finishing stage. The stages in the disclosed system is clearly very different from the stages in the traditional multi-stage flashing distillation and multi-stage membrane distillation, because of the unique features such as active vacuum operation through inter-connected vapor path and self-distillation, among other things as described herein.

In another embodiment, a distillation method is provided. The distillation method comprises supplying an unpurified liquid or sea water in an input feed stream with a feed pump; providing a finishing stage with a finishing condenser and a secondary condenser and configured to receive the input feed stream, pass the feed through the cooling pipes of the two condensers to all preceding stages; providing a condensation-induced vacuum generator and actuator for supplying vacuum to the two condensers in the finishing stage, and establish the low pressure in all the condensers in the preceding stages; providing N inter-stages each with a spray evaporator, a primary condenser and a secondary condenser; providing one heating stage with a spray evaporator, a primary condenser and a heater; providing each spray evaporator configured to monitor its liquid level and concentration; providing each spray evaporator configured to receive and spray the feed, evaporate portion of the feed and pass the vapor to the primary condenser, circulate the remaining feed through the cooling pipe of the primary condenser, receive fresh feed for maintaining circulation flow rate, and discharge the concentrated feed; providing each primary condenser configured to receive vapor from the spray evaporator and produce an output of an at least partially purified liquid and uncondensed vapor with NCG; providing each secondary condenser with a pressure regulator and configured to receive vapor with NCG from the primary condenser in the immediately preceding stage, produce an output of an at least partially purified liquid and uncondensed vapor with NCG, and pass the remaining vapor and NCG through the pressure regulator and vapor path to the finishing condenser in the cooling stage; providing a NCG accumulator 70 and configured to receive any NCG extracted by the vacuum generator and actuator.

The condensation-induced vacuum generator is more energy efficient than the conventional vacuum technology. The integrated system uses latent heat of steam from vacuum generation for increasing the temperature of the input feed, thereby producing additional energy savings.

The system in accordance with the disclosed embodiments not only is scalable but also requires no expensive replacement parts (such as membranes and pre-filters required in MD and RO systems), in addition to using only low-temperature energy resources for low-pressure steam generation. Thus, the system is cost efficient in both facility and operation.

Any combination and/or permutation of the embodiments are envisioned. Other objects and features will become apparent from the following detailed description considered in conjunction with the accompanying drawings. It is to be understood, however, that the drawings are designed as an illustration only and not as a definition of the limits of the present disclosure.

BRIEF DESCRIPTION OF THE DRAWINGS

To assist those of skill in the art in making and using the disclosed distillation systems and methods, reference is made to the accompanying figures, wherein:

FIG. 5 is a schematic diagram of an exemplary vacuum vaporization distillation unit without any inter-stage module.

DETAILED DESCRIPTION

The following detailed description is exemplary in nature and is not intended to limit the present disclosure or the application and uses of the embodiments of the present disclosure. Descriptions of specific devices, techniques, and applications are provided only as examples. Modifications to the examples described herein will be readily apparent to those of ordinary skill in the art, and the general principles defined herein may be applied to other examples and applications without departing from the spirit and scope of the present disclosure. The present disclosure should be accorded scope consistent with the claims, and not limited to the examples described and shown herein.

Embodiments of the present disclosure may be described herein in terms of functional and/or logical block components and various processing steps. It should be appreciated that such block components may be realized by any number of hardware, software, and/or firmware components configured to perform the specified functions. For the sake of brevity, conventional techniques and components related to vacuum generation techniques, desalination, distillation, steam plants, pressure regulators, ducting systems, sensors, control systems, and other functional aspects of the systems and the individual operating components of the systems may not be described in detail herein. In addition, those skilled in the art will appreciate that embodiments of the present disclosure may be practiced in conjunction with a variety of structural bodies, and that the embodiments described herein are merely example embodiments of the present disclosure.

Figure 1:
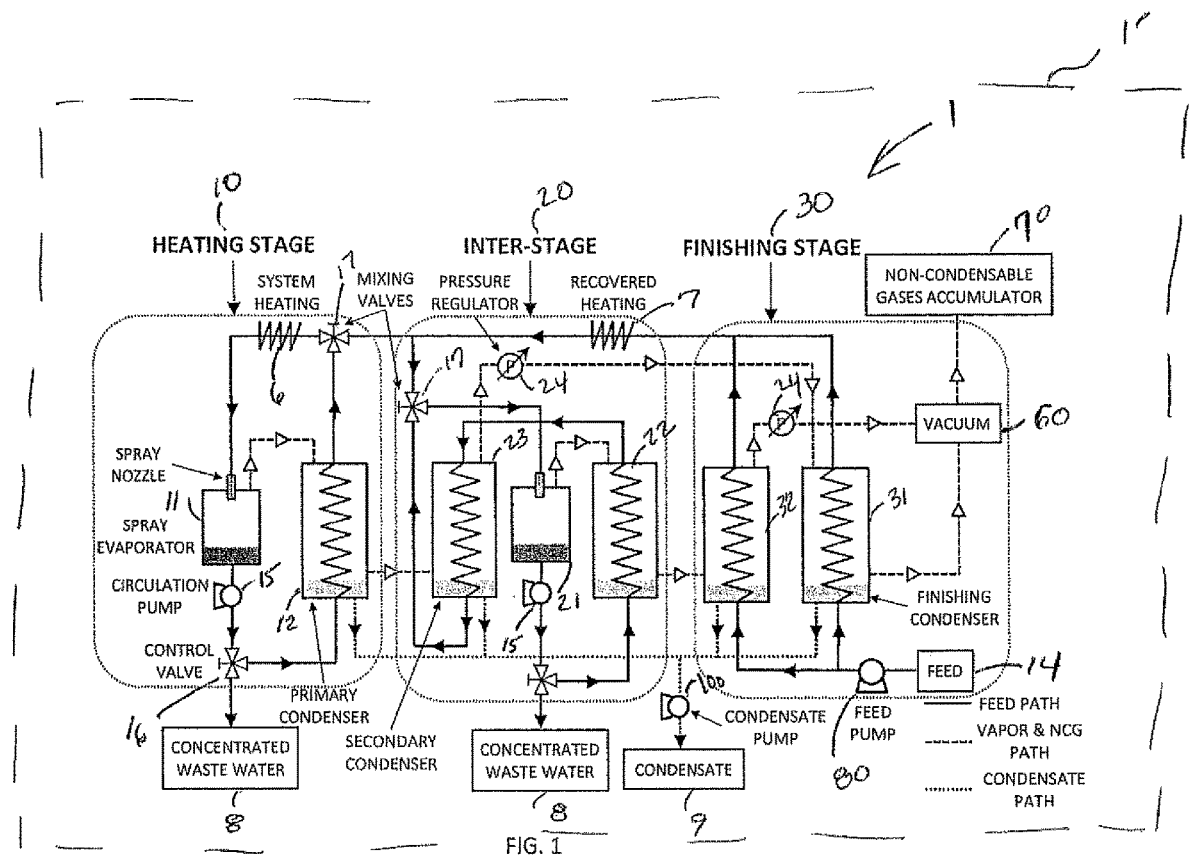
FIG. 1 is a schematic diagram of an exemplary vacuum vaporization distillation unit with one inter-stage module.

FIG. 1 is a schematic diagram of an exemplary vacuum vaporization distillation unit 1 with one inter-stage module, in accordance with an exemplary embodiment. For the embodiment illustrated in FIG. 1, the distillation system could comprise a heating stage 10, an inter-stage 20, and a finishing stage 30. Depending on the embodiment an inter-stage 20 may or may not be utilized. For example, as shown in FIG. 5, an inter-stage 20 is removed.

The heating stage 10 could comprise a heating element or a heat exchanger, a spray evaporator 11, and a primary condenser 12. The heating stage 10 could be configured to receive a feed 14 for distillation, pressurize and heat the input feed to the state of a compressed liquid, then spray the feed 14 into its spray evaporator 11. The spray droplets would partially vaporize in the lower pressure environment established in the primary condenser 12 by a vacuum source. The vapor would separate from spray droplets and flow into the primary condenser 12. The remaining droplets would settle to form colder but more concentrated liquid. The primary condenser 12 would receive the colder liquid formed by the remaining droplets into its cooling pipe through a circulation pump 15 as coolant for an immediate condensation of the same vapor just extracted into the primary condenser 12. The same liquid would then be circulated back again as the feed to the spray evaporator of the heating stage 10. A switch or transmitter would monitor the liquid level inside the spray evaporator and be used to control the operation of the associated circulation pump.

Another switch or transmitter would monitor the liquid concentration in each evaporator and be used to control the removal of concentrated liquid from the circulation. Whenever the concentration of the liquid reaches a desired level, a control valve 16 would direct the liquid to exit the circulation. A mixing valve 17, a check valve for example, would allow the fresh feed to be added into the re-circulated feed to compensate for any loss due to the removal of concentrated liquid from circulation and the vapor generation from the evaporator. While the location of adding fresh feed into the circulation is shown in FIG. 1 to be at a point where the liquid exits the primary condenser, the location could alternatively be at a point before the liquid enters the primary condenser. The location may be chosen based on, for example, but without limitation, a temperature of the fresh feed, and a temperature of the circulated liquid at the location. The lower pressure in the primary condenser would be maintained by the vacuum source through the secondary condenser 23 in the inter-stage 20. Any remaining vapor and accumulated non-condensable gases in the primary condenser chamber would flow into and be condensed further by the secondary condenser 23 in the inter-stage 20.

Figure 2:
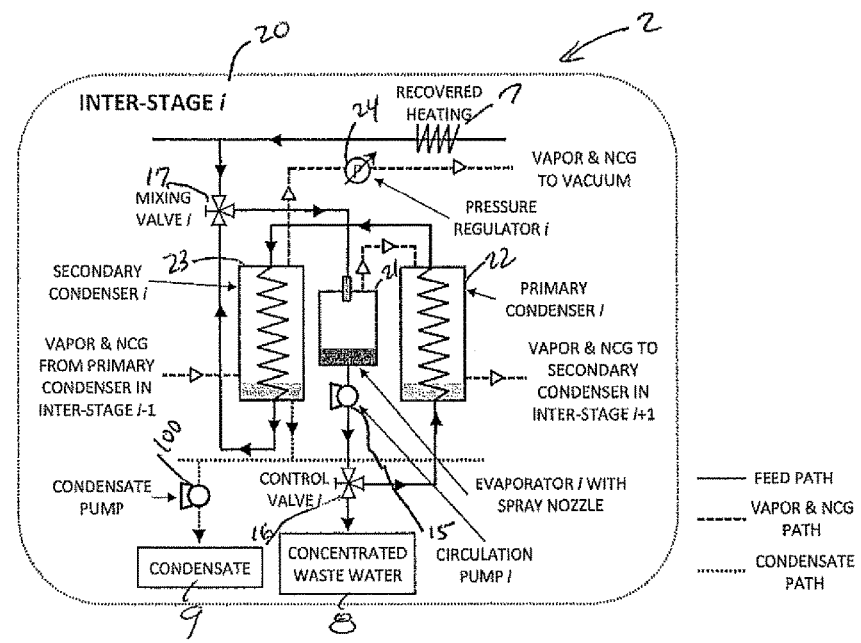
FIG. 2 is a schematic diagram of an exemplary inter-stage module for forming staggered multi-stage vacuum vaporization distillation unit.

The inter-stage 20, which is also described in FIG. 2 for its use in multi-stage configuration, could comprise a spray evaporator 21, a primary condenser 22, and a secondary condenser 23. The spray evaporator 21 and the primary condenser 22 would work together in a manner similar to the pair in the heating stage 10 and perform self-distillation, but the condensation-heated liquid would be recirculated in a different way. After passing through the cooling pipe in the primary condenser, the colder liquid would continue through the cooling pipe of the secondary condenser 23 and then be circulated back again as the feed to the spray evaporator 21 of this stage. Again a mixing valve 17, a check valve for example, would allow the fresh feed to be added into the re-circulated feed to compensate for any loss due to the removal of concentrated liquid and water vapor from the spray evaporator 21 and the removal of water condensate from the condensers. Similar to the heating stage 10, the location of adding fresh feed into the circulation may be chosen based on, for example, but without limitation, a temperature of the fresh feed, and a temperature of the circulated liquid at the location. The lower pressure in the primary condenser would be maintained by the vacuum source through the secondary condenser in the finishing stage. Any remaining vapor and accumulated non-condensable gases in the primary condenser chamber 22 would flow into and be condensed further by the secondary condenser 32 in the finishing stage 30.

The finishing stage 30 comprises a primary finishing condenser 31 and a secondary condenser 32. The secondary condenser 32 would be configured to receive any remaining vapor and accumulated non-condensable gases from the primary condenser 22 or 12 in the preceding inter-stage 20 or the heating stage 10 if there is no inter-stage. The finishing condenser 31 would be configured to receive any remaining vapor and accumulated non-condensable gases from the secondary condensers 23 of all inter-stages 20. Both condensers would be configured to receive the source feed through a feed pump 80 into their cooling pipes as coolant. The source feed would receive some heat from any remaining vapor and accumulated non-condensable gases flowing through the two condensers and condense some or all the remaining vapor. The same feed would then be supplied to the heating stage 10 and inter-stage 20 through mixing valves 17 (including but not limited to check valves for example) as the original circulating liquid as well as the replacement for the water condensate removed from the all the primary and secondary condensers and the concentrated liquid removed from all the spray evaporators. After leaving the condensers in the finishing stage 30 and before becoming the circulating feed to each previous stage, the source feed would be configured to receive recovered heat from the hot water produced by the vacuum generation unit for heat recovery. The non-condensable gas (NCG) and any residue of condensable vapors after the finishing stage 30 will be extracted into the vacuum system for further process or disposal.

The system could include components to measure and control process variables, such as level, pressure and temperature, as required for effective performance. FIG. 1 contains definitions for lines used in the drawing. Three different line styles are used to illustrate the flow paths of the feed, vapor and NCG, and condensate.

FIG. 2 is a schematic diagram of an exemplary inter-stage 20 module, designated as module i, for forming staggered multi-stage vacuum vaporization distillation unit according to an embodiment of the present disclosure. This inter-stage 20 module would contain all the components of the inter-stage module in FIG. 1, with additional information on its interaction with an immediately preceding module i−1, and an immediately following module i+1. The same line styles as shown in FIG. 1 are used. In a system with N inter-stages, the immediately preceding stage for the first inter-stage (that is i=1) is the heating stage and the immediately following stage for the last inter-stage (that is i=N) is the finishing stage.

Figure 3:
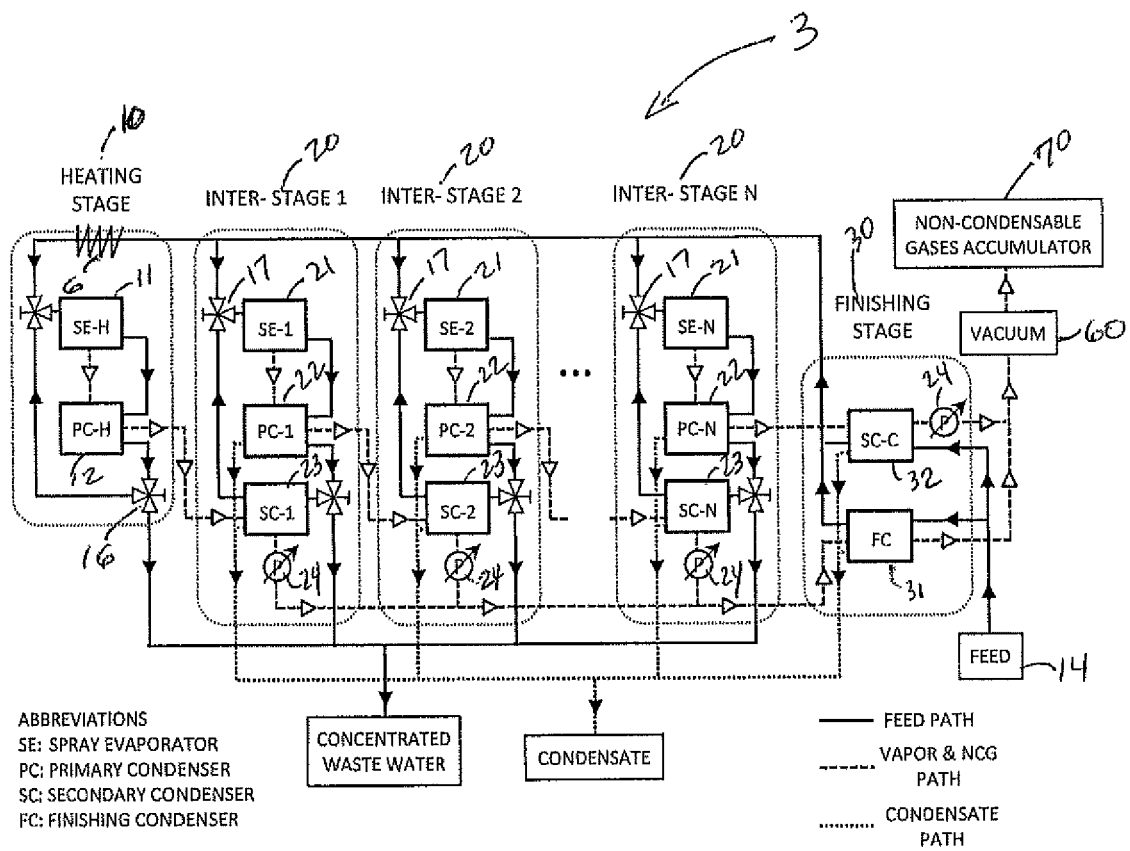
FIG. 3 is a schematic diagram of an exemplary staggered multi-stage vacuum vaporization distillation unit.

FIG. 3 is a schematic diagram for an exemplary staggered multi-stage vacuum vaporization distillation unit 3. In this embodiment, a system could comprise of one heating stage 10, N inter-stages 20, and one finishing stage 30 as illustrated. The spray evaporators, primary condensers, and secondary condensers are all represented by blocks and labeled with their abbreviations. The system 3 would operate in the same manner as the system described in FIG. 1, except that the heating stage 10 would be followed by and interact with the inter-stage 1 and the finishing stage 30 would follow and interact with the inter-stage N. The interactions among the N inter-stages would be in accordance with the manner described in FIG. 2. The number N can be any number greater than or equal to one. The number N may be chosen based on, for example, but without limitation, a flow rate control, a processing capacity, an inter-stage cost, a temperature range, and an energy use.

Figure 4:
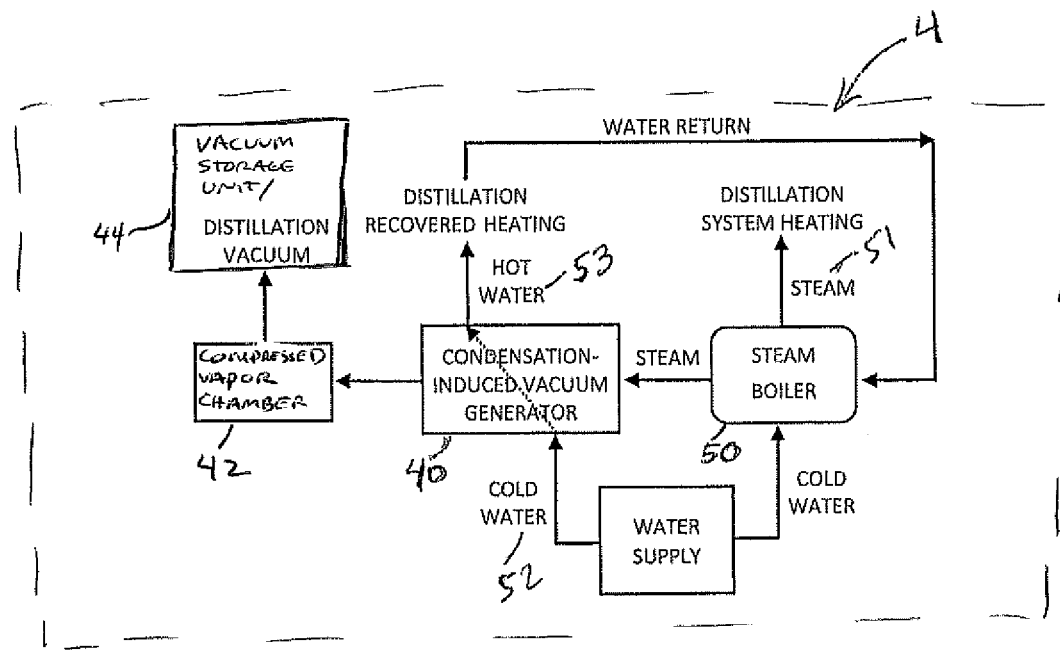
FIG. 4 is a schematic diagram of an exemplary integration of a condensation-induced vacuum generation unit with a distillation system.

FIG. 4 is a schematic diagram of an exemplary integration of a condensation-induced vacuum generation unit with a distillation system 4. The condensation-induced vacuum generation unit is disclosed as United States Patent Application Publication US 20170356431 by Chao et. al. titled System and Method for Multilevel Vacuum Generation and Storage, incorporated by reference herein. The distillation system 4 would be in fluidic communication with the condensation-induced vacuum generator unit 40 to receive the vacuum, the system heating and the recovered heating produced by the vacuum generator unit in the following manner. A cold water could be supplied to a boiler 50 for generating a steam 51. Portion of the steam 51 could serve as the system heating for the distillation system 4. Another portion of the steam 51 could be inserted into one chamber of a dual-action piston-cylinder formed by a piston and fill the chamber. Any content such as air inside the other chamber of the dual-action piston-cylinder formed by the piston would be pushed out of the chamber. A cold water 52 could then be supplied to cooling channels on the dual-action piston-cylinder and condense the steam to generate vacuum inside the chamber. After one chamber of a dual-action piston-cylinder is depressurized to a nearly vacuum state, steam would be inserted into the other chamber. The pressure of the steam, together with the rough vacuum would move the piston and the rod connected to the piston. By repeated operations of inserting and condensing steam in each chamber alternatively, the piston would perform reciprocating motion. The piston rod would in turn actuate a vacuum pump and generate the vacuum through a tank for the distillation system. The cold water for inducing the steam condensation inside the cylinder could receive the latent heat from the steam and become hot water. The hot water 53 would serve as the recovered heating for the distillation system 4. After delivered the heat to the distillation system, the steam and the hot water would become colder water and return to the boiler.

FIG. 5 is a schematic diagram of an exemplary vacuum vaporization distillation unit 5 without any inter-stage module. This unit is a special embodiment in which an inter-stage 20 is not been utilized and the number N is equal to zero. The system would operate in the same manner as the system described in FIG. 1, except that the heating stage 10 would be followed by and interact with the finishing stage 30' directly without any inter-stage 20. Furthermore, only one condenser 33 is needed in this finishing stage 30' to receive any remaining vapor and accumulated non-condensable gases from the primary condenser 12 in the heating stage 10. This condenser 33 combines the function of both the finishing condenser 31 and the secondary condenser 32 of the finishing stage 30 in FIG. 1 and FIG. 3.

In an alternative exemplary integration of a condensation-induced vacuum generation unit 40 with a distillation system 4, a fresh feed for distillation could be directed to flow through the cooling channels on the wall of the dual-action piston-cylinder for inducing the condensation of the steam inside the chambers of the dual-action piston-cylinder and receive the recovered heat directly before being sprayed into the evaporators of the distillation system. This alternative method of integration may be chosen based on, for example, but without limitation, a type and nature of the liquid being distilled, and a type of wall material used for the cylinder.

The disclosed system, however, does not need pre-treatment, such as deareation and anti-scalent additions, of liquid for removal of the non-condensable gases inside the liquid and is more tolerant of variations in liquid conditions.

The pressure difference between the saturated pressure of hot evaporating feed and the vapor pressure in the evaporator drives vaporization. In the absence of active vacuum extraction and NCG, the vapor pressure would be slightly lower but close to the thermal equilibrium pressure at the vapor inlet of condenser, due to the vapor flow that condenses through the condenser. Depending upon the cooling rate to the condenser, there would be a self-balanced vaporization and condensation. The disclosed system would atomize feed at the state of a compressed liquid to form droplets inside the evaporators. The droplets would vaporize in space without surface contact and avoid the surface scaling or fouling problem. During atomized spray vaporization, the internal energy of atomized droplets would be the main heat source for the vaporization and residues of the droplets would release latent heat and become cooler. The effective pressure difference could be much higher through active vacuuming operation than the pressure difference reached at the thermodynamic equilibrium in the traditional processes. This higher pressure difference would increase both the evaporation rate and condensate yield. Active vacuuming operation could also significantly reduce feed concentration and temperature gradient near vaporization surface, which are known respectively as concentration polarization and temperature polarization. Concentration polarization and temperature polarization are two phenomena that limit the vaporization and affect yield. Most importantly, the active vapor extraction also promotes a non-thermal-equilibrium vaporization process during which the vapor generated and residue droplets eventually possess different averaged temperatures, which makes the self-condensation (i.e., vapor condensed by cooling from residue droplets), an extra-distillation, feasible within the same vaporization process. At the self-contained vaporization and condensation, driven by the thermal-equilibrium pressure difference between evaporator and condenser, this extra-distillation ability would be lost to the thermal equilibrium between vapor and feed in the evaporator, i.e., some hotter vapors just generated have to re-condensate right back to the colder feed residue to reach a thermal equilibrium within the evaporator.

Self-distillation is the primary mode of condensation in all but the finishing stage for distillation and latent heat recovery of the vapor. Any uncondensed vapor would receive further condensation in the secondary and finishing condensers of the finishing stage. Any non-condensable gases would flow through the vapor paths and be removed by the vacuum.

The process could have functions, material, and structures that are similar to the embodiments shown in FIGS. 1-5. Therefore, common features, functions, and elements may not be redundantly described here.

Depending on the embodiment, the process begins with an action by the vacuum generation unit to establish low pressure in the condensers and evaporators (task 1).

The process continues with an action of the feed pump to move the liquid to be distilled through the cooling pipes of the two condensers in the finishing stage. The flow of liquid continues to the spray nozzles of the evaporators, while receiving heat from the recovered heating and the system heating along the way (task 2).

The process may continue by spraying the liquid into the evaporators to form droplets or fine streams. The droplets or fine streams partially evaporate to produce vapor and the remaining colder droplets or streams settle inside the evaporator (task 3).

After the liquid formed by the settled remaining droplets or streams inside the evaporator reaches a predetermined level, the process could continue by pumping the liquid into the cooling pipes of the primary and secondary condensers. The liquid is then re-circulated back to the spray nozzles (task 4).

Next the process could continue by condensing portion of the vapor flowed into the primary condensers from the evaporators and produce condensate inside the primary condensers. Any remaining vapor and non-condensable gases inside the primary condensers could then flow into their corresponding secondary condensers in the immediately following stages (task 5).

The process could then continue by condensing portion of the vapor inside the secondary condensers and produce condensate inside the secondary condensers (task 6).

When pressure inside a secondary condenser is over a predetermined level due to accumulated vapor and non-condensable gases, the pressure regulator connected to the condenser would allow the vapor and non-condensable gases to exit the condenser and flow to the finishing condenser (task 7).

Whenever the concentration of the liquid inside an evaporator reaches a predetermined level, a control valve would direct the liquid to exit the circulation (task 8).

Water condensate inside a condenser would be pumped out the condenser to maintain a predetermined level (task 9).

Mixing valves, check valves for example, would allow fresh feed to be added into the re-circulated feed to compensate for any loss of liquid due to the removal of concentrated liquid and water vaporization from the evaporators (task 10).

Various items, such as flow-control switches and transmitters, are disclosed in the specification but are not shown in the drawings. These commercially available items are important in controlling the system operations. They perform their described functions such as monitoring the conditions of the fluids in the system and operating the valves and pumps etc. accordingly.

The disclosed system is highly reliable, scalable, and simple to operate with a low maintenance cost and a wide applicability. In addition, many green and renewable energy resources, such as solar energy, can also be used for low-pressure steam generation and other operations, such as pumping and controlling, in the system.

Accordingly, disclosed is a distillation system that utilizes integrated vacuum generation for vacuum distillation that requires low energy input and low capital costs. The distillation system disclosed herein has an advantage over conventional thermal distillation technologies in that the vacuum is obtained with a compression cylinder driven by an integrated dual-action piston-cylinder vacuum generation technology, which is both more energy efficient and quieter than conventional vacuum pumps. In addition, the latent heat of steam condensation during the vacuum generation provides the heat to replace portion of external sources of heat needed to raise the temperature of the input feed. By combining vacuum generation and vapor compression, the disclosed system and method significantly lower energy requirements, compared to conventional thermal distillation. Other advantages of the distillation system disclosed herein could include, but not limit to, the reduction in scale formation and the avoidance of non-condensable gases accumulation inside the evaporators and condensers.

A method is provided for distillation and desalination of a liquid (e.g., waste water or sea water). The method comprises pressuring and heating the liquid to be distilled and then atomizing the liquid under a depressurized environment to vaporize in space without surface contact. The method also includes self-distillation with the colder remaining droplets as coolant for an immediate condensation of the same vapor just evaporated from those droplets. The method includes enhanced heat recovery through a staggered multistage arrangement with active vacuum action.

The desalination system and method, depending on the embodiment, may or may not comprise a vacuum vaporization distillation module, a condensation-induced vacuum generator in fluidic communication with the vacuum vaporization distillation module, a vacuum storage unit, a compressed vapor chamber, and various flow-control valves and regulators.

The vacuum vaporization distillation module 1 is a tower enclosure 1' and configured to receive an input feed stream for desalination, and produce an output flow of a condensed feed stream and an output flow of a mixture of water condensate and uncondensed vapor. The vacuum vaporization distillation module may or may not contain a heating element or heat exchanging pipe for heating the input feed stream near the vaporization zone, a vacuum channel for extracting and condensing vapor, a discharge channel for removing condensed feed stream, and a sprinkler for producing fine droplets of feed stream within the vaporization zone.

The condensation-induced vacuum generator 40 is disposed within an enclosed cylinder and configured to receive steam and to produce vacuum inside the cylinder by the condensation as a coolant passing through the channels of the cylinder. A vacuum storage unit 44 is disposed within an enclosure and configured to maintain a vacuum level through the vacuum generator 40 and receive gaseous content from the vapor channel of the distillation module. The condensation-induced vacuum generator 40 is configured to receive cooling water and transfer heat generated during condensation of steam to the water through its heat exchange channels and produces the heated water for the distillation module 4.

A compressed vapor chamber 42 could be configured to receive gaseous content from the vacuum generator 40 and to provide additional vacuum to the vacuum storage unit when its content is also condensed through cooling. Alternatively, vapor residue could be further processed by compression back into the distillation tower by the condensation-induced vacuum generator. The condensation of vapor produced in distillation module 4 is achieved, depending on the embodiment, by transferring the latent heat of vaporization to the feed stream when vapor flowing through the vapor channel disposed within the feed stream. The condensation also helps to reduce the vapor pressure, and hence enhances the vacuum extraction. The energy efficiency of the disclosed thermal distillation system is achieved in one embodiment through the conservation of latent heat during both vacuum generation and distillation.

A desalination method is provided in accordance with another embodiment. The desalination method could comprise supplying an unpurified liquid in an input feed stream that is self-driven by the pressure difference between the vacuum in the distillation tower and the ambient pressure; providing a condensation-induced vacuum generator disposed within an enclosed cylinder and configured to receive steam and configured to passing the cooling water through its heat exchange channels and produce vacuum inside the cylinder; providing distillation module disposed within an enclosure and configured to receive the input feed stream, discharge the condensed feed stream and produce an output of an at least partially purified liquid and vapor; passing the heated water through distillation module as a heat source; providing a vacuum storage unit prepared by the vacuum generator and configured to maintain vacuum within, and withdrawing a vapor from, the distillation module, and wherein a latent heat of condensation of withdrawn vapor is transferred directly to the upward moving feed flow and then to a latent heat of vaporization during the desalination process.

The vapor withdrawn from the vacuum storage unit into the vacuum generator is pushed into and condensed inside the compressed vapor chamber. The condensation-induced vacuum generator is more energy efficient than the conventional vacuum technology. The integrated system and method, depending on the embodiment, uses latent heat of steam condensation during steam generation for increasing the temperature of the input feed stream at the vaporization zone, thereby producing additional energy savings.

While the present disclosure has been illustrated and described in typical embodiments, it is not intended to be limited to the details shown, since various modifications and substitutions can be made without departing in any way from the spirit of the present disclosure. As such, further modifications and equivalents of the present disclosure herein disclosed may occur to persons skilled in the art using no more than routine experimentation, and all such modifications and equivalents are believed to be within the spirit and scope of the present disclosure.

What is claimed is:

1. A vacuum distillation and desalination system, comprising:
    a heating stage, the heating stage including a heating element or a heat exchanger, a heating stage spray evaporator, and a heating stage primary condenser or a heating stage self-distillation condenser; the heating stage configured to receive a source feed for distillation, pressurize and heat the feed to a state of a compressed liquid, and spray the feed into the heating stage spray evaporator; and the heating element or the heat exchanger configured to receive heat generated from a heat source or a waste heat resource; the heating stage spray evaporator and the heating stage primary condenser in fluid communication with each other;
    a finishing stage for vapor condensation and heat recovery, the finishing stage having a finishing primary condenser and a finishing secondary condenser; the finishing secondary condenser configured to receive any remaining vapor and accumulated non-condensable gases from a primary condenser chamber in an immediately preceding stage; the finishing primary condenser configured to receive any remaining vapor and accumulated non-condensable gases from secondary condensers of all preceding stages; and both the finishing secondary and finishing primary condensers configured to receive the source feed through a feed pump into cooling pipes as coolant, whereby the source feed receives heat from any remaining vapor and accumulated non-condensable gases flowing through the finishing primary and finishing secondary condensers and condense some or all remaining vapor;

one or more inter-stages, each of the one or more inter-stages including an inter-stage spray evaporator, an inter-stage primary condenser, and an inter-stage secondary condenser;

the inter-stage spray evaporator and the inter-stage primary condenser in fluid communication with each other to perform self-distillation, whereby a liquid is formed from a residue droplet and the liquid after passing through a cooling pipe in the inter-stage primary condenser continues through the inter-stage secondary condenser for condensing a vapor from either the heating stage primary condenser for a first inter-stage or an inter-stage primary condenser of an immediately preceding inter-stage for any subsequent inter-stage, while being heated-up from condensation heat absorption, and then circulated back again as a re-circulated feed to the inter-stage spray evaporator;

a mixing valve to permit the feed into the re-circulated feed to compensate for loss due to removal of concentrated liquid and water vaporization from the inter-stage spray evaporator;

the inter-stage secondary condenser in fluid communication with the inter-stage primary condenser of the immediately preceding stage or the heating stage primary condenser for the first inter-stage, the inter-stage secondary condenser configured to receive from the inter-stage primary condenser of the immediately preceding stage or the heating stage primary condenser for the first inter-stage, a remaining vapor and an accumulated non-condensable gas for second condensation of the remaining vapor; and whereby pressure in the inter-stage primary condenser and the inter-stage secondary condenser is maintained by a vacuum source through a pressure regulator, and the remaining vapor and the accumulated non-condensable gas in the inter-stage secondary condenser flows through the pressure regulator and processed further by the finishing stage primary condenser in the finishing stage.

2. The vacuum distillation and desalination system of claim 1, wherein the finishing stage further includes a vacuum generation unit, and a non-condensable gases accumulator in communication with the primary and secondary condensers of the finishing stage.

3. The vacuum distillation and desalination system of claim 1, wherein residue of non-condensable vapor after the finishing stage is extracted into a finishing stage vacuum generation unit for further process or disposal.

4. The vacuum distillation and desalination system of claim 3, further including a non-condensable gases accumulator in communication with the finishing stage.

5. The vacuum distillation and desalination system of claim 1, wherein the system contains no membrane and pre-filter as required in Membrane Distillation (MD) and Reverse Osmosis (RO) systems.

6. The vacuum distillation and desalination system of claim 1, wherein the heating stage includes the heating stage self-distillation pair of spray evaporator and primary condenser, a heating stage flow-control sensor, a heating stage valve and a heating stage pump.

7. The vacuum distillation and desalination system of claim 6, wherein the heating stage is configured to receive the feed, wherein the feed is waste water or sea water for distillation, and pressurize and heat the feed to a state of a compressed liquid to allow spraying of the feed into the heating stage spray evaporator.

8. The vacuum distillation and desalination system of claim 6, wherein the heating element or the heat exchanger receives steam generated from a steam boiler or waste steam; and spray droplets partially vaporize in a lower pressure environment than ambient pressure that is produced by a vacuum source, and the heating element or the heat exchanger produce an output flow of vapor and the remaining droplets settle to form concentrated liquid.

9. The vacuum distillation and desalination system of claim 1, wherein each of the one or more inter-stages further includes an inter-stage pump in fluid communication with the inter-stage spray evaporator, the inter-stage primary condenser, and the inter-stage secondary condenser.

10. The vacuum distillation and desalination system of claim 1, wherein the heating stage, each of the one or more inter-stages, and the finishing stage are combined as a vacuum vaporization distillation module.

11. The vacuum distillation and desalination system of claim 10, wherein the vacuum vaporization distillation module further contains a heating element or heat exchanging pipe for heating the input feed stream near a vaporization zone;

a vacuum channel for extracting and condensing vapor;
a discharge channel for removing condensed feed stream; and
a sprinkler for producing fine droplets of feed stream within the vaporization zone.

12. A method of using a vacuum distillation and desalination system, comprising:

providing a heating stage, the heating stage including a heating element or a heat exchanger, a heating stage spray evaporator, and a heating stage primary condenser or a heating stage self-distillation condenser; the heating stage configured to receive a source feed or a feed liquid for distillation, pressurize and heat the feed to a state of a compressed liquid, and spray the feed into the heating stage spray evaporator; and the heating element or the heat exchanger configured to receive heat generated from a heat source or a waste heat resource; the heating stage spray evaporator and the heating stage primary condenser in fluid communication with each other;

providing a finishing stage for vapor condensation and heat recovery, the finishing stage having a finishing primary condenser and a finishing secondary condenser; the finishing secondary condenser configured to receive any remaining vapor and accumulated non-condensable gases from a primary condenser chamber in an immediately preceding stage; the finishing primary condenser configured to receive any remaining vapor and accumulated non-condensable gases from secondary condensers of all preceding stages; and both the finishing secondary and finishing primary condensers configured to receive the source feed through a feed pump into cooling pipes as coolant, whereby the source feed receives heat from any remaining vapor and accumulated non-condensable gases flowing through the finishing primary and finishing secondary condensers and condense some or all remaining vapor;

providing one or more inter-stages, each of the one or more inter-stages including an inter-stage spray evaporator, an inter-stage primary condenser, and an inter-stage secondary condenser;

the inter-stage spray evaporator and the inter-stage primary condenser in fluid communication with each other to perform self-distillation, whereby a liquid is formed from a residue droplet and the liquid after passing through a cooling pipe in the inter-stage primary condenser continues through the inter-stage secondary condenser for condensing a vapor from either the heating stage primary condenser for a first inter-stage or an inter-stage primary condenser of an immediately preceding inter-stage for any subsequent inter-stage, while being heated-up from condensation heat absorption, and then circulated back again as a re-circulated feed to the inter-stage spray evaporator;

providing a mixing valve to permit the feed into the re-circulated feed to compensate for loss due to removal of concentrated liquid and water vaporization from the inter-stage spray evaporator;

the inter-stage secondary condenser in fluid communication with the inter-stage primary condenser of the immediately preceding stage or the heating stage primary condenser for the first inter-stage, the inter-stage secondary condenser configured to receive from the inter-stage primary condenser of the immediately preceding stage or the heating stage primary condenser for the first inter-stage, a remaining vapor and an accumulated non-condensable gas for second condensation of the remaining vapor; and whereby pressure in the inter-stage primary condenser and the inter-stage secondary condenser is maintained by a vacuum source through a pressure regulator, and the remaining vapor and the accumulated non-condensable gas in the inter-stage secondary condenser flows through the pressure regulator and processed further by the finishing stage primary condenser in the finishing stage.

13. The method of claim 12, wherein the feed liquid is an unpurified liquid or sea water.

14. The method of claim 12,
wherein each spray evaporator is configured to monitor liquid level and concentration.

15. The method of claim 12, wherein latent heat of steam is used for increasing temperature of the feed liquid.

\* \* \* \* \*